US007686520B2

(12) United States Patent
Fingler et al.

(10) Patent No.: US 7,686,520 B2
(45) Date of Patent: Mar. 30, 2010

(54) FIBER-OPTIC PREMISES WIRING SYSTEM

(76) Inventors: Larry Fingler, 6 Old Forge Drive, King City, Ontario, L7B 1K4 (CA); Iain Galloway, Stratford (CA); Nadine Sutcliffe, 15 Mac Beth Court, Stratford, Prince Edward Island, C1B 2X2 (CA)

( * ) Notice: Subject to any disclaimer, the term of this patent is extended or adjusted under 35 U.S.C. 154(b) by 194 days.

(21) Appl. No.: 10/545,375

(22) PCT Filed: Feb. 12, 2004
(Under 37 CFR 1.47)

(86) PCT No.: PCT/CA2004/000176

§ 371 (c)(1),
(2), (4) Date: Aug. 28, 2006

(87) PCT Pub. No.: WO2004/073216

PCT Pub. Date: Aug. 26, 2004

(65) Prior Publication Data
US 2006/0285802 A1 Dec. 21, 2006

(51) Int. Cl.
*G02B 6/36* (2006.01)
*G02B 6/12* (2006.01)
*H04B 10/20* (2006.01)
(52) U.S. Cl. .......................... 385/88; 385/147; 398/58
(58) Field of Classification Search .................. 385/14, 385/88–94, 147; 398/58–64
See application file for complete search history.

(56) References Cited

U.S. PATENT DOCUMENTS

| 5,210,788 | A | 5/1993 | Nilssen |
| 2002/0057709 | A1 | 5/2002 | Edmon et al. |
| 2003/0012485 | A1* | 1/2003 | Neeley et al. ............... 385/16 |

FOREIGN PATENT DOCUMENTS

| EP | 0 664 637 A1 | 7/1995 |
| EP | 0 763 910 A2 | 3/1997 |
| EP | 0 763 910 A3 | 3/1997 |

OTHER PUBLICATIONS

Minami et al., "A200 Mbit/s Synchronous TDM Loop Optical LAN Suitable for Multiservice Integration", IEEE Journal on Selected Areas in Communications, IEEE Inc., New York, U.S., vol. SAC-3, No. 6, Nov. 1985, pp. 849-858, XP000810108.
PCT Search Report and PCT Written Opinion.

* cited by examiner

*Primary Examiner*—Kevin S Wood
(74) *Attorney, Agent, or Firm*—Harness, Dickey & Pierce

(57) ABSTRACT

A premises wiring system (112) comprising a back-end interface (122) communicating with at least one communications system and a front-end interface (126) communication with disparate communications devices configured for electrical signalling. At least one fiber-optic pair (146) couples the front-end and back-end interfaces. The front-end and back-end interfaces convert electrical signals destined for transmission over the pair into optical signals prior to transmission.

21 Claims, 8 Drawing Sheets

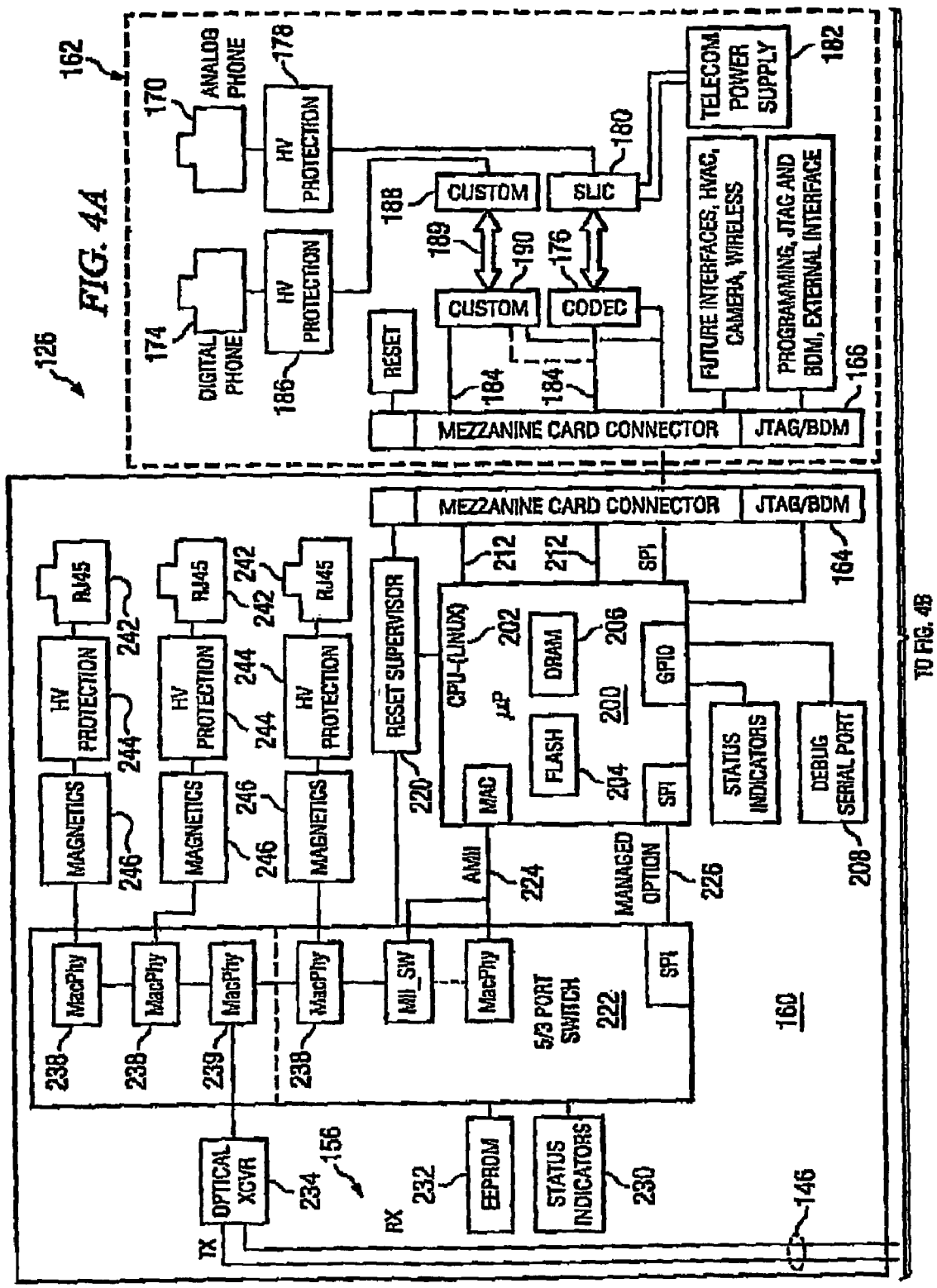

FIBER-OPTIC PREMISES WIRING SYSTEM

TECHNICAL FIELD

The present invention relates generally to communications and in particular to a fiber-optic premises wiring system. Specifically, the present invention relates to a system for converting electrical signals to optical signals and back to electrical signals to enable communications among devices configured for electrical communications at a premises wired for fiber-optic communications.

BACKGROUND ART

Today's businesses rely significantly on communications and a variety of technologies to access, convey and process information. As such, a premium is placed on information technology that increases communications speed and bandwidth.

Conventionally, copper wires have been used in connection with communication systems. Fiber-optic "wiring," however, is replacing copper wire in many homes and businesses. Specifically, fiber-optic cable is being more commonly used as the communications medium to interconnect communications devices such as telephones, facsimile machines and computer workstations to each other and to back-end communications systems' components. Fiber-optic cable provides significant advantages over its copper cable counterpart. Fiber-optic cable has increased capacity, which allows transmission of much more information than conventional copper wire. Additionally, fiber-optic cable provides for less signal degradation as compared to copper cable, requires less maintenance, and is more difficult to tap into. Furthermore, fiber-optic cable is far less subject to electromagnetic interference than copper wire.

Despite these advantages, most current information technology for user-premises voice and data communications does not employ fiber-optic cable to interconnect with communications devices, nor do suppliers of such information technology promote use of fiber-optic cable. Additionally, copper cable manufacturers have had a significant amount of success in improving communications over existing or slightly improved copper cable. As a result, adoption of user-premises fiber-optics has been slow. Furthermore, since current information technology generally does not require fiber-optic cable for high or optimum performance, and applications that require fiber-optic cable are limited, the push to utilize fiber-optic cable rather than copper cable has been limited notwithstanding the advantages associated with fiber-optic cable.

During construction of new facilities and renovations of older facilities, fiber-optic backbones are often installed on the assumption that copper cabling will eventually be replaced with fiber-optic cabling. In fact, it is anticipated that within the next five to ten years, most communications systems will use fiber-optic networks that bring fiber to the desk, i.e. use fiber-optic cable to interconnect communications devices to the back-end supporting information technology.

Installing fiber-optic cable and components within a premises is a costly investment. These significant costs, especially considering the costs of adopting fiber-compatible devices at the desk (e.g., phones and computers with optical network interfaces), have made businesses hesitant to convert to fiber-optic cable at this time. As such, there is a need for a cost-effective solution for installing fiber-optic cable within existing premises to allow businesses to switch to fiber-optic cable now in order to enjoy its benefits, while facilitating the future implementation of exclusive or primary optical-based (fiber-optic-to-desk) systems.

DISCLOSURE OF THE INVENTION

Disclosed herein are embodiments of a fiber-optic premises wiring system for converting electrical signals to optical signals and back to electrical signals to enable communications devices configured for electrical communications to communicate over a fiber-optic link. One embodiment includes a front-end interface to which at least one communications device configured for electrical signalling is to be connected. This embodiment also includes a back-end interface to be connected to a back-end communications system. Connecting the front-end-interface to the back-end interface in the disclosed embodiments is a premise-based fiber-optic link.

The use of fiber-optic cable to interconnect the communications devices and the back-end communications system increases the capability of the system while reducing maintenance costs and electromagnetic/radio frequency interference (EMI/RFI). Furthermore, security is increased due to the fact that it is more difficult to tap into fiber-optic cable than copper cable. In this embodiment, the electrical signalling between the communications device connected to the front-end interface and the back-end communications system is converted into optical signalling for transmission between them, and is reconverted by the front-end and back-end interfaces to electrical signalling for transmission to the communications device and back-end communications system. By coupling the communications devices to the back-end communications system through fiber-optic cable, the amount of space required for carrying the same bandwidth is significantly reduced. In addition to employing the more compact and higher bandwidth optical cables rather than copper, the use of the fiber-optic premises wiring system allows longer, direct runs from the user desktops to the back-end interface equipment such as network servers, eliminating the need for remote servers and/or repeaters. Accordingly, the premises communications equipment can be consolidated, and floor space otherwise allotted to communications closets can be eliminated.

The front-end interface may be designed to accommodate different types of communications devices. It may, for example, include a series of jacks, into which one or more communications devices are to be plugged, and circuitry to support the jacks. The front-end interface may further comprise a microcontroller to process signals received from and destined to the connected communications devices, a switch or switches to control signal flow, and at least one fiber-optic transceiver to convert optical signals received from the fiber-optic link into electrical signals and to convert electrical signals received from the microcontroller into optical signals.

Further to the front-end interface, the back-end interface may include a series of jacks, into which one or more back-end communications systems are to be plugged, and circuitry to support the jacks. The back-end interface may also include a microcontroller to process signals received from and destined to the communications devices, a switch or switches to control signal flow, and at least one fiber-optic transceiver to convert optical signals received from the fiber-optic link into electrical signals and to convert electrical signals received from the processor into optical signals.

The switches of the front-end and back-end interfaces may be Ethernet switches, whereby the front-end and back-end interfaces communicate over the fiber-optic link via an Internet protocol (IP) connection. Further, the premises wiring system may be interfaced to at least one back-end telephony communications system, whereby at least one communications device within the premises may be a telephony device, such as a telephone or fax machine, configured for electrical signalling. Included in this embodiment would be a signal conversion system acting between the back-end communications system and the communications device or devices. The signal conversion system (a) converts electrical signalling being exchanged between the communications device or devices and the back-end communications system into optical signalling for transmission over the premises fiber-optic system and (b) reconverts the optical signalling into electrical signalling for delivery to the communications device or devices or back-end communications system. By the use of fiber-optic technology, longer cable runs between the communications devices and the back-end communications system can be made without signal amplification, which results in lower premises wiring system costs.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A and 4B illustrate a schematic block circuit diagram of a signal conversion system including front-end and back-end modular interfaces showing the interconnection between a wallbox and a back-end communications system forming part of the fiber-optic premises wiring system of FIG. 3;

FIG. 8B illustrates a perspective view of the wallbox of FIG. 7a.

BEST MODE FOR CARRYING OUT THE INVENTION

Figure 1:
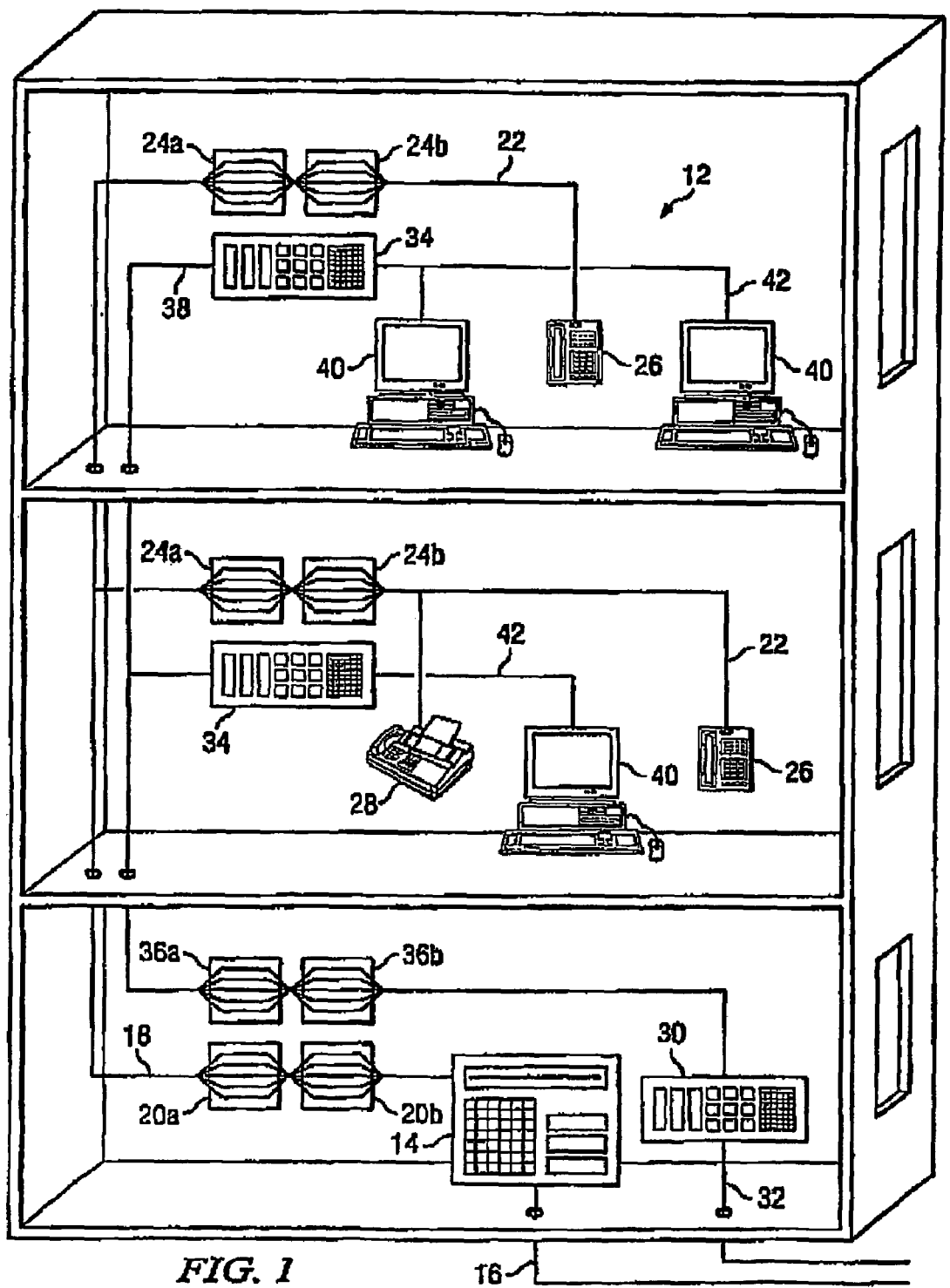
FIG. 1 illustrates a standard prior art copper premises wiring system within a building.

FIG. 1 is a art component diagram of a multi-story building wired with a standard prior art copper premises wiring system 12. The copper premises wiring system 12 includes a main telephone switch 14 that receives an incoming copper telecommunications cable 16 entering the building, thereby connecting the premises to a back-end telephone communications system. The telephone switch 14 is connected to a copper distribution cable 18 via a pair of patch panels 20a and 20b. Runs of copper cable 22 are connected to the copper distribution cable 18 via patch panels 24a, 24b and terminate at jacks (not shown) positioned throughout the building. Communications devices such as telephones 26 and facsimile machines 28 are connected to the jacks.

An active computer network component 30 such as a server also receives an incoming copper telecommunications cable 32 entering the building, thereby connecting the premises to a back-end data communications system. The active computer network component 30 is connected to other computer network components 34 positioned throughout the building via a pair of patch panels 36a, 36b and a copper distribution cable 38. Computer workstations 40 are connected to the computer network components 34 via runs of copper cable 42. In this manner, the telephones 26, facsimile machines 28, and computer workstations 40 all communicate with back-end communications systems over copper cable connections.

Figure 2:
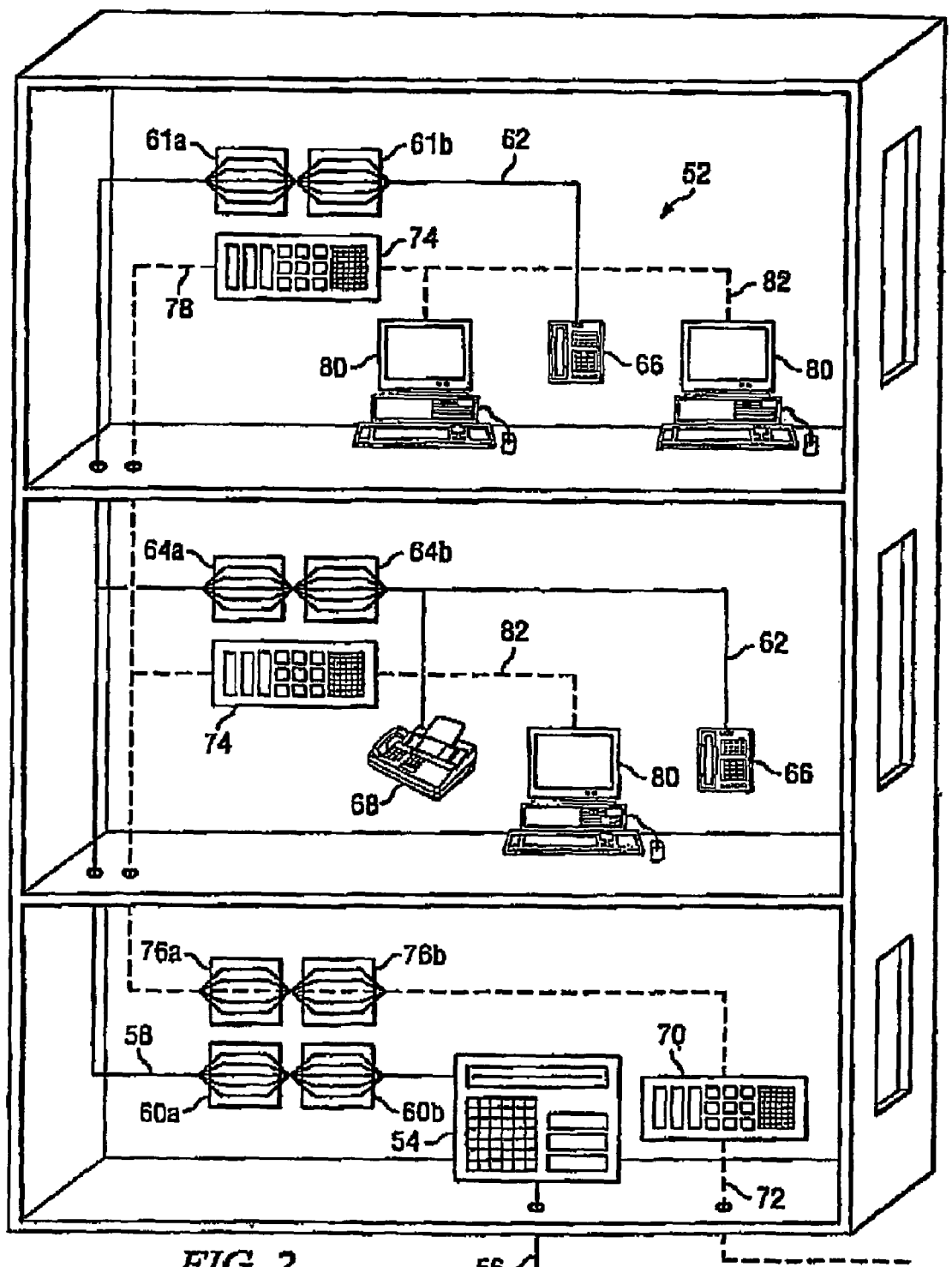
FIG. 2 illustrates a standard prior art combined copper and fiber-optic premises wiring system within a building.

FIG. 2 is another component diagram of a multi-story building wired with a prior art combined copper and fiber-optic premises wiring system 52. The combined copper and fiber-optic premises wiring system 52 includes a main telephone switch 54 that receives an incoming copper telecommunications cable 56 entering the building similar to the copper premises wiring system 12 shown in FIG. 1. The telephone switch 54 is connected to a copper distribution cable 58 via a pair of patch panels 60a, 60b. Runs of copper cable 62 are connected to the copper distribution cable 58 via patch panels 64a, 64b and terminate at jacks (not shown) positioned throughout the building. Telephones 66 and facsimile machines 68 are connected to the jacks.

In the embodiment illustrated in FIG. 2, an active computer network component 70 such as a server receives an incoming fiber-optic telecommunications cable 72 entering the building. Computer network component 70 is connected to other computer network components 74 positioned throughout the building via a pair of patch panels 76a, 76b and a fiber-optic distribution cable 78. Computer workstations 80 are connected to the computer network components 74 via runs of fiber-optic cable 82. In this manner, telephones 66 and facsimile machines 68 communicate with a back-end telephone communications system over copper cable connections, while the computer workstations 80 communicate with a back-end data communications system over fiber-optic cable connections.

Figure 3:
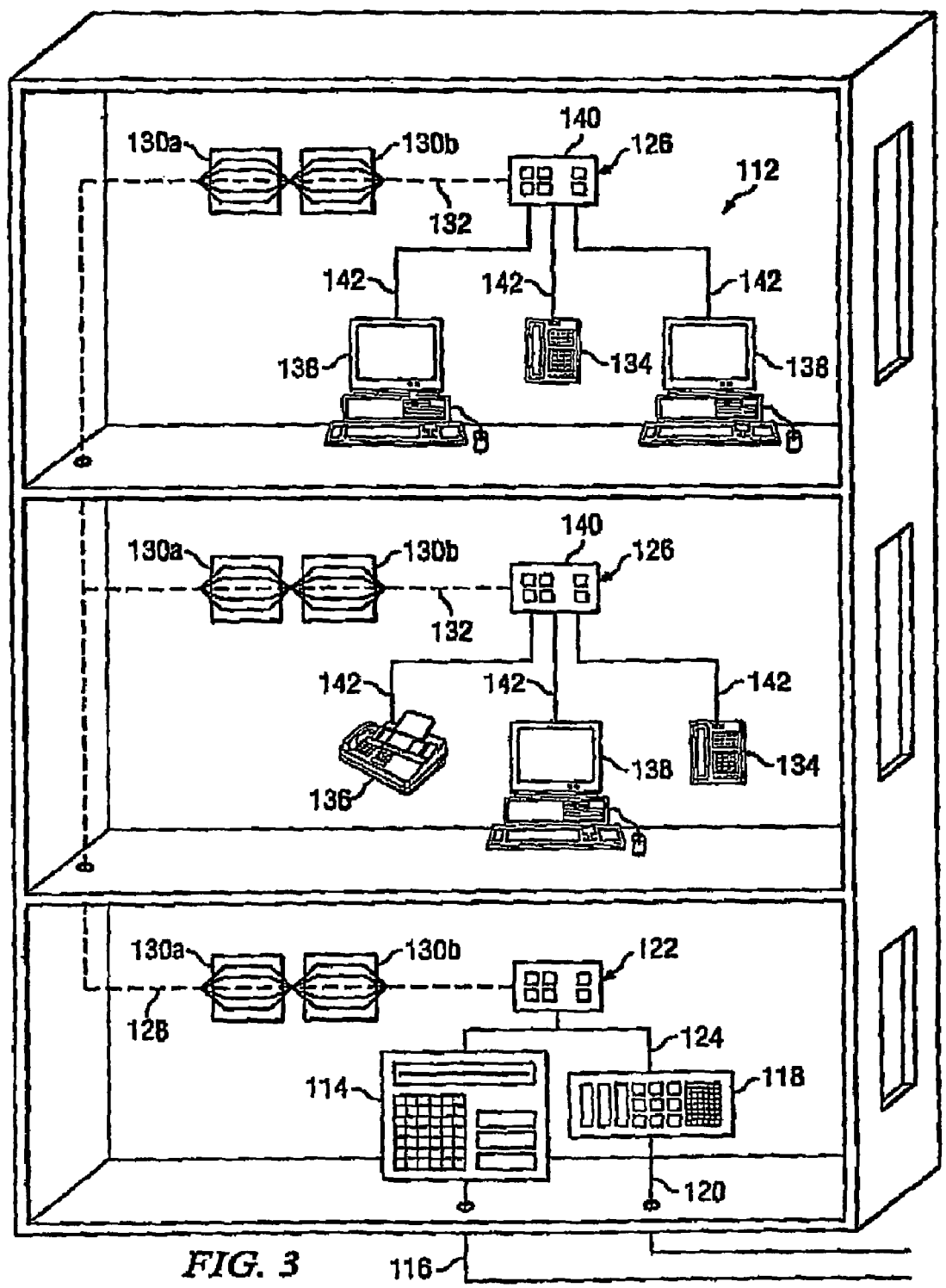
FIG. 3 illustrates a fiber-optic premises wiring system within a building in accordance with the present invention.

Turning to now to FIG. 3, a multi-story building is shown wired with the present fiber-optic premises wiring system 112. As shown, fiber-optic premises wiring system 112 includes a main telephone switch 114 that receives an incoming copper-based telecommunications line 116 entering the building and a computer network component 118, which is a server 118 in this embodiment, that receives an incoming copper telecommunications cable 120. The telephone switch 114 and the server 118 are connected to a back-end interface 122 via copper cables 124. The back-end interface 122 is connected to one or more front-end interfaces 126 positioned throughout the building via a fiber-optic distribution cable 128, pairs of patch panels 130a, 130b, and runs of fiber-optic cable 132. Communications devices such as analog or digital telephones 134, facsimile machines 136, and computer workstations 138 are connected to the front-end interfaces 126.

The fiber-optic premises wiring system 112 allows copper-based communications devices (e.g., telephones 134, facsimile machines 136 and computer workstations 138) to communicate throughout the building network using fiber-optic communications rather than the copper-based communications with which they were designed to operate. The back-end interface 122 of the fiber-optic premises wiring system 112 provides communications to copper-based communication services, including both voice and data services. For example, the main telephone switch 114, which maybe a private branch enclosure (PBX) system, is shown connected to the copper-based telecommunications line 116 that may lead to a telephone company's central office exchange (not shown) or other telecommunications carrier. The server 118 is shown connected to the copper telecommunications cable 120 that may lead to another service provider network computer, which may be an Internet Service Provider (ISP) or other data communications provider. Previously, these elements would be connected to the various user communications or computing equipment through traditional copper-based communication systems. For example, the server 118 would typically have been connected to the user terminals through an Ethernet connection such as a Cat 5E, Cat 6 or other local area network protocol. Main telephone switch 114 would typically have been connected to telephone lines and telephones 134 via patch cables and copper wires.

Back-end interface 122 is provided to convert electrical signals to optical signals for communication throughout the building. Front-end interfaces 126 are provided in proximity to the communications devices such as the telephones 134, facsimile machines 136, and computer workstations 138 in order to reconvert the optical signals back to copper-based communication signals. Such optical signals include phone communication signals or local area network communication signals such as through an Ethernet as previously described. The back-end interface 122 and front-end interfaces 126 form a signal conversion system to convert electrical signals to optical signals and back to electrical signals to allow the communications devices to communicate with back-end communications systems over fiber-optic connections.

Still referring to FIG. 3, the back-end interface 122 and front-end interfaces 126 contain microcontrollers 200, 300 (see FIGS. 4A and 4B) and other electronics to provide an interface between the fiber-optic premises wiring system 112 and the copper-based electrical equipment. The microcontrollers 200, 300 provide translation from any type of disparate data or voice communication devices that are connected to them. Specifically, the intelligence of the microcontrollers 200, 300 allows the existence of the fiber-optic premises wiring system 112 to be essentially transparent to the electrical equipment connected at either the back-end or front-end interfaces 122, 126.

The back-end and front-end interfaces 122, 126 may be incorporated into wallboxes 140, as will be further described with reference to FIGS. 8A and 8B. For example, the front-end interfaces 126 may be accommodated within wallboxes 140, with the wallboxes 140 housing an array of jacks designed to accommodate the various different types of communications devices. Since the fiber-optic cable 132 terminates at the wallboxes 140 or other boxes, efficient and quality termination of the fiber-optic cable is facilitated. Communications devices such as telephones 134, facsimile machines 136, computer workstations 138, and other devices may be plugged into the jacks of the wallboxes 140 via conventional copper terminal connections 142, which would include runs of copper cable 22, 42 for at least phone and data connections as illustrated in FIG. 1. As will be appreciated, unlike the prior-art premises wiring systems 12, 52 illustrated in FIGS. 1 and 2, in the present fiber-optic premises wiring system 112, communications devices are coupled to back-end communications systems through a common fiber-optic cable 132 rather than through multiple copper cables handling voice and data separately or through separate copper and fiber-optic premises wiring systems. As a result, when a premises' communications devices migrate to communicate directly with optical networking equipment and back-end optical communications systems via their own integrated optical interfaces, the infrastructure will be in place in a given premises to enable this full optical networking.

Figure 4B:
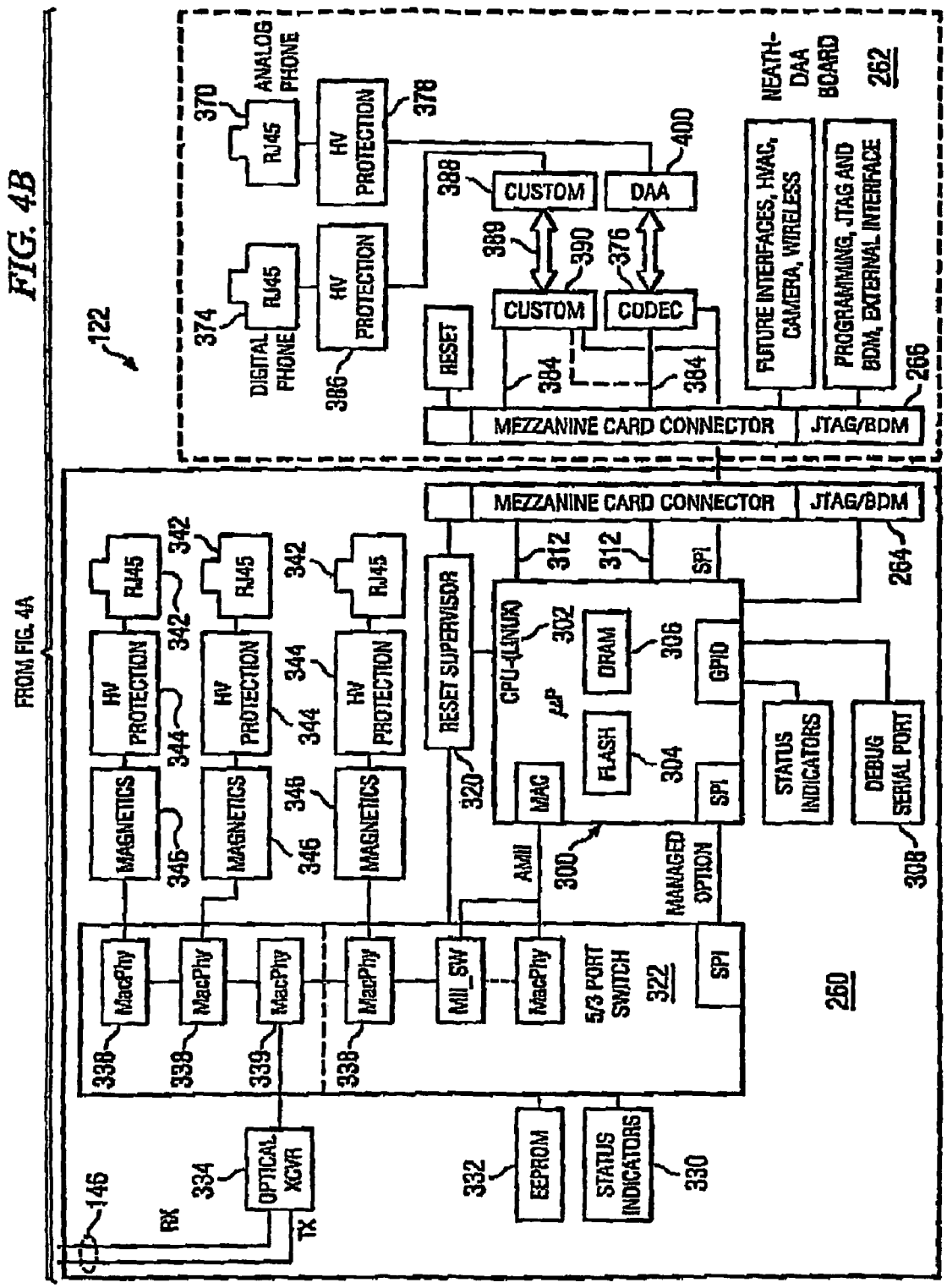

Referring now to FIGS. 4A-B, illustrated is a schematic block circuit diagram of the electronic circuitry connected to the back-end interface 122 and to one of the front-end interfaces 126. The front-end interface 126 and back-end interface 122 are coupled by a fiber-optic link 146 forming part of the run of fiber-optic cable 132 and the fiber-optic distribution cable 128. In this particular embodiment, the fiber-optic link 146 in this embodiment includes a pair of optic fibers namely a transmit (Tx) fiber and a receive (Rx) fiber.

The front-end interface 126 includes a pair of interconnected interface subsystems, specifically a Fiber-Optic Premises Interface Subsystem (FOPIS) board 160 and a telephony device interface subsystem (NEATH-SLIC board) 162. The FOPIS board 160 and NEATH-SLIC board 162 are modular and are mounted on separate circuit boards that are releasably connected through mezzanine circuit board card connectors 164 and 166. The FOPIS board 160 provides the interface between the fiber-optic premises wiring system 112 and Ethernet equipment. The FOPIS board 160 includes the microcontroller 200, which runs an embedded Linux operating system 202 or other operating system software. In the present embodiment, the microcontroller 200 includes embedded flash Read Only Memory (ROM) 204, Dynamic Random Access Memory (DRAM) 206, and a debug serial port 208. The microcontroller 200 is coupled to the mezzanine circuit board card connector 164 via a General Channel Interface (GCI) 212.

NEATH-SLIC board 162 provides the interface to both the digital and analog telephones 134. NEATH-SLIC board 162 includes an analog telephone jack 170, which may be a six-wire RJ11 connection, to receive the copper terminal connection 142 from an analog telephone 134 and an RJ16 digital telephone jack 174 to receive the copper terminal connection 142 from a digital telephone 134. The analog telephone jack 170 is coupled to a Coder/Decoder (Codec) 176 via a High Voltage (HV) protection circuit 178 and a Subscriber Line Interface Circuit (SLIC) 180. The Codec 176 provides digital to analog and analog to digital encoding and decoding as between the digital-based fiber-optic communication system and the telephones 134. The SLIC 180 provides hardware voltages and signalling for interfacing to the analog telephone jack 170, as well as the voltages which are supplied to generate standard tones, e.g., "ring" and "busy" tones, from the telecommunications power supply 182. The SLIC 180 is also coupled to the tip and ring lines extending from the telecommunications power supply 182. The Codec 176 is coupled to the mezzanine circuit board card connector 166 via a GCI 184. When the mezzanine circuit board card connectors 164, 166 matingly engage, the GCIs 184, 212 are interconnected. The GCIs 184, 212 provide a framed communications facility between the Codec 176 and the microcontroller 200.

The digital telephone jack 174 is also connected to the mezzanine circuit board card connector 166 via an HV protection circuit 186 to interface with a back-end digital telephone system. For interfacing the telephone 134 to FOPIS board 160, analog and digital voltages 189 are provided at a custom chip 188 for the interface to the telephone 134. Digital encoding translation between the telephone 134 and the building communications system is provided by custom chip 90. The custom chips 188, 190 may be memory mapped or include a GCI 184.

Phone communications are linked to the FOPIS board 160 through the mezzanine circuit board card connectors 164, 166 and directly to microcontroller 200. The connection to microcontroller 200 may be through a GCI or Interactive Data Language (IDL) interface. If IDL is used, a separate data channel, such as an SPI control channel, is used for the out of band signalling to control the Codec 176. PCM-based encoding may be used for the digital encoding of the analog signals between the telephones 134 and the microcontroller 200. The flash ROM 204 and DRAM 206 enables certain functions and programmability of the microcontroller 200. Flash ROM 204 and DRAM 206 provide non-volatile and volatile memory for microcontroller 200, respectively. For instance, the operation system of the Linux would initially be stored on the flash ROM 204, while the DRAM 206 would be used as a working space for processing of the information traveling through the microcontroller 200 and routed within the FOPIS board 160.

Provided as an external interface to the microcontroller 200 is a debug serial port 208 to allow external debug control and monitoring of the system. The microcontroller 200 is also connected to an Ethernet switch 222 via an Agile Manufacturing Information Infrastructure (AMII) interface 224 and a Serial Peripheral Interface (SPI) 226. The SPI 226 is provided for control of the Ethernet switch 222 by he microcontroller 200. The Ethernet switch enables the microcontroller 200 to communicate with the outside world and vice versa through Ethernet or TCP/IP interface methods. Also provided is an Electrically-Erasable Programmable Read Only Memory (EEPROM) 232 for storing system configuration information and status indicators 230, such as light emitting diodes (LEDs). The Ethernet switch 222 provides output to the status indicators 230 and is connected to the EEPROM 232, and a fiber-optic transceiver 234. The Ethernet switch 222 includes three Ethernet transceivers 238, which are 10/100 BaseT transceivers in this embodiment. Each Ethernet transceiver 238 is connected to a data communications connection 242, which is an Ethernet jack 242 in this embodiment, through an HV protection circuit 244, and a magnetic circuit 246. The fiber-optic transceiver 234 is coupled to the pair of optic fibers of fiber-optic link 146. The configuration information in EEPROM 232 provides a means of configuring the Ethernet switch 222 on start-up. Another possible means of configuring the Ethernet switch 222 would be through instructions from the microcontroller 200.

The Ethernet jacks 242, which may be physically RJ45 jacks, provide direct copper interfaces to disparate communications devices. Specifically, the Ethernet jacks 242 allow communication to computer communications devices through standard wire-based Ethernet communication. The Ethernet switch 222 interfaces on its other side to the fiber-optic transceiver 234 by its 100baseFX network switch 239, thereby providing a combined electrical signal to fiber-optic transceiver.

As previously mentioned, phone connections are made to telephones 134 through the NEATH-SLIC board 162. It is possible to configure multiple other NEATH boards for communication with many different disparate communications devices through whatever interface methods are custom designed into the various NEATH-SLIC boards 162.

The back-end interface 122 also includes a pair of interconnected interface subsystems, specifically another Fiber-Optic Premises Interface Subsystem (FOPIS) board 260 and a telecommunications equipment interface subsystem (NEATH-DAA) board 262. FOPIS board 260 and NEATH-DAA board 262 are modular and mounted on separate circuit boards that are releasably connected through mezzanine circuit board card connectors 264, 266.

FOPIS board 260 of the back-end interface 122 includes a microcontroller 300 running an embedded operating system 302, which is a Linux operating system 302 in this embodiment. The microcontroller 300, similarly to the microcontroller 200 of the front-end interface 126, includes a flash ROM 304, DRAM 306, a debug serial port 308 and a debug Ethernet port 310. The microcontroller 300 is connected to a reset supervisor 320 and to an Ethernet switch 322. The Ethernet switch 322 also communicates with a bank of status indicators 330, configuration EEPROM 332, and a fiber-optic transceiver 334. The Ethernet switch 322 includes three Ethernet transceivers 338, each communicating with a data communications connection 342, which is an Ethernet jack 342 is this embodiment, through an HV protection circuit 344 and a magnetic circuit 346. The fiber-optic transceiver 334 is coupled to the pair of optic fibers of fiber-optic link 146. At the input from the optical fiber link 146, the fiber-optic transceiver 334 provides an optical signal based on the combined 100Base FX Ethernet signals received from the Ethernet transceivers 338 of the Ethernet switch 322.

The microcontroller 300 is coupled to the mezzanine circuit board card connector 264 via a GCI 312. When the mezzanine circuit board card connector 264 matingly engages with the mezzanine circuit board card connector 266 of the NEATH-DAA board 262, the GCI 312 is connected to the GCI 384 of the NEATH-DAA board 262.

The NEATH-DAA board 262 includes a Codec 376 coupled to the GCI 384. An RJ45 analog jack 370, or other suitable physical connector, is coupled to Codec 376 via an HV protection circuit 379 and a Data Access Arrangement (DAA) 400 to interface with the back-end interface 122. An RJ45 digital jack 374 is also connected to the mezzanine circuit board card connector 266 through an HV protection circuit 386 and custom interface circuits 388, 390. The analog jack 370 receives incoming copper analog signals from an analog telephone switch 114 and the jack 374 connects to a line leading to the main telephone switch 114. Main telephone switch 114 can be either analog or digital.

The Ethernet switches 222, 322 provide TCP/IP routing of the connections between the Ethernet signals provided at the fiber-optic transceiver 334 to the separate Ethernet ports of the FOPIS board 260 and specifically to the three illustrated ports associated with the RJ45 10/100 BaseT Ethernet jacks 342.

The microcontrollers 200, 300 associated with their respective FOPIS board 160, 260 can provide a number of functions. The telephony-based functions provided by the microcontrollers 200, 300 are a provisioning of low-level communications with the Codec 376 and the sending and receiving of data to and from the Codecs 176, 376. The microcontrollers 200, 300 are also operable to send and receive control signals to and from various other components including the Codecs 176, 376. The microcontrollers 200, 300 are still further responsible for the control set-up and management of a phone call, which is separate from the voice communications provided surrounding a particular phone call. It is possible that communications between elements within the fiber-optic premises wiring system 112 could be managed separately and apart from the main telephone switch 114. In other words, the microcontrollers 200, 300 could provide direct communication between different telephones 134 at different locations without the necessity of routing those signals back to the main telephone switch 114. In order to avoid inconvenience, the fiber-optic premises wiring system 112 may enable long-haul communications without sending a signal back to the main telephone switch 114. The use of optical fiber communications rather than copper-based telephony is beneficial when operating in a hostile environment such as in locations that are close to arc welders and other Electro-Magnetic Pulse (EMP)-heavy environments, or in chemical environments where the surrounding chemicals might degrade copper-based connection systems.

From a database or data communications context, the microcontrollers 200, 300 also increase the capabilities of the fiber-optic premises wiring system 112. For example, the microcontrollers 200, 300 can provide the configuring of the Ethernet switches 222, 322 to provide certain levels of quality service or certain bandwidth on different ports of the FOPIS boards 160, 260 or the back-end interface 122 or front-end interface 126. Further, the microcontrollers 200, 300 can turn particular connections or data communications ports on or off, and can provide V-LAN tagging, whereby the source of the original communications is determined by a server or another workstation in the communication with a sending workstation, and whereby accordingly the front-end interface 126 is operable to make routing decisions regarding incoming packet data.

The microcontrollers 200, 300 also enable provisioning of their respective NEATH interface boards 162, 262 through web-based configuration. In other words, the microcontrollers 200, 300 provide web-servers by which an administrator can access the configuration of the NEATH interface boards 162, 262 and make adjustments according to building optical wiring system needs. Other means of communication with the microcontrollers 200, 300 through TCP/IP communications would include e-mail type communications or FTP communications in addition to web-based interfacing.

An important feature of the configuring or the provisioning of the respective NEATH boards 162, 262, is the ability to upload software updates or other important data or configuration information to a particular interface board. By providing the microcontrollers 200, 300 with this ability to upload software updates, it is possible to quickly fan-out system design changes and improvements to a large number of connected microcontrollers without the need for reinstalling EEPROM configuration chips or other removable memory devices.

The FOPIS boards 160, 260 shown in FIGS. 4A and 4B include Ethernet jacks 242, 342 connecting to the Ethernet transceivers 238, 338 of the Ethernet switches 222, 322. Through the same Ethernet switches 222, 322 voice signals are received and transmitted. More specifically, the microcontrollers 200, 300 interface with the MII_SW using the AMII protocol to encode voice signals received ultimately from the copper-based front-end telecommunications equipment.

Figure 5:
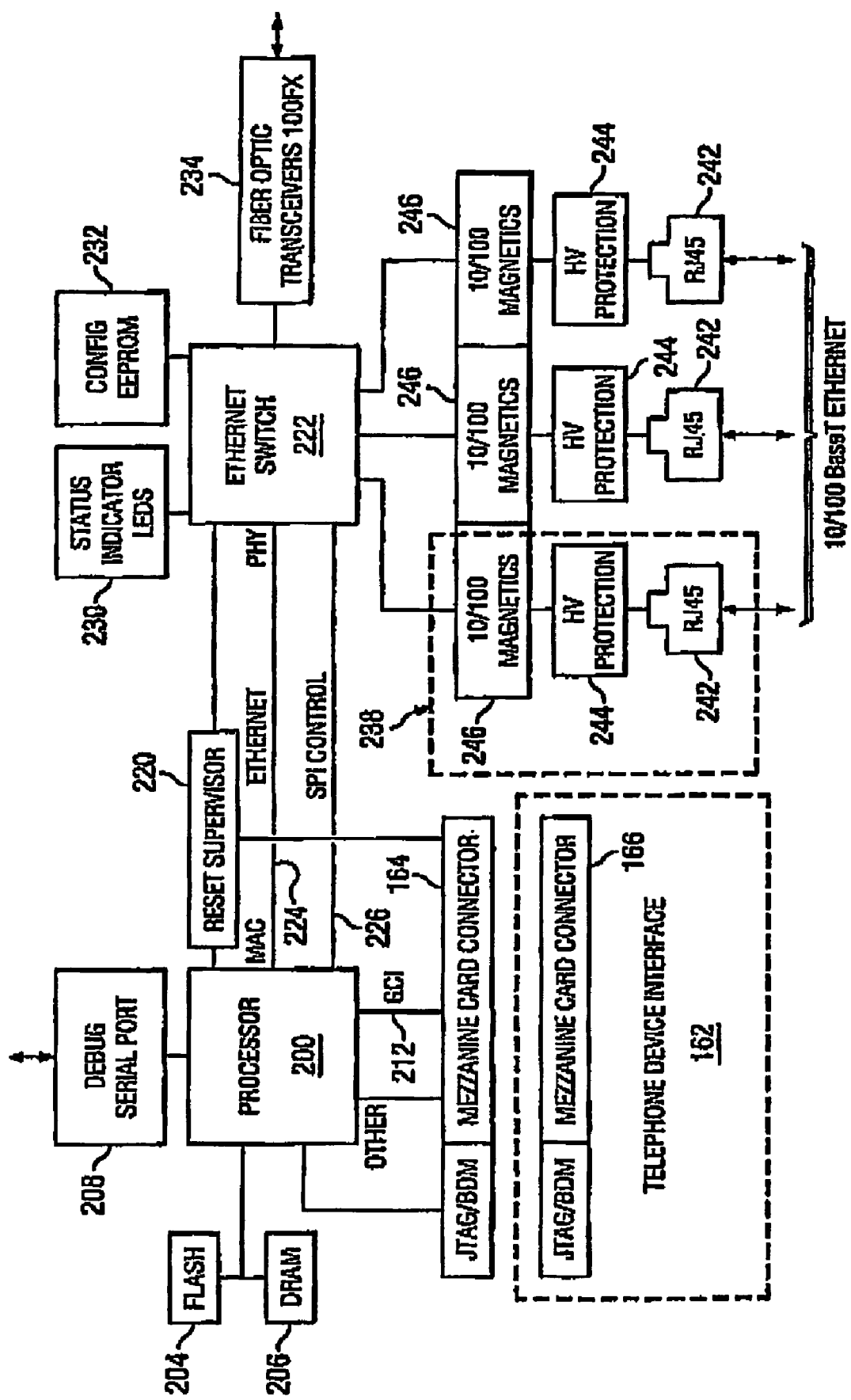
FIG. 5 is illustrates a schematic block circuit diagram of a portion of FIGS. 3 and 4.

FIG. 5 is a more general schematic diagram of the circuitry shown in FIGS. 4A and 4B, and the discussions of FIGS. 4A and 4B also describe the operations of the FIG. 5 circuit. In general, the circuitry of FIG. 5 is generally applicable as a higher-level schematic block diagram of either of the back-end interface 122 or front-end interface 126, although the reference numbers shown in FIG. 5 correspond to the elements in the front-end interface. It should be understood, however, that in certain embodiments, including those described above with respect to FIGS. 4A-4B, that the same circuit elements may be used for either of the back-end and front-end interfaces 122, 126. In the illustrated embodiment, the flash ROM 204 and DRAM 206 are shown as being external rather than embedded.

During power-up, the operating systems 202, 302 of the microcontrollers 200, 300 in the back-end and front-end interfaces 122, 126 go through initialization. During this initialization process, the back-end and front-end interfaces 122, 126 establish a communications relationship using an appropriate communications protocol. In the present embodiment, the back-end and front-end interfaces 122, 126 communicate using Internet Protocol (IP). During initialization, IP addresses assigned to the back-end and front-end interfaces 122, 126 are exchanged by the microcontrollers 200, 300 over the fiber-optic link 146 and a client/server relationship between the back-end and front-end interfaces 122, 126 is negotiated to establish an IP link between them.

Daemons are used by the Linux operating systems 202, 302 running on the microcontrollers 200, 300 to control and maintain communications between the back-end and front-end interfaces 122, 126. The Linux operating systems 202, 302 separate communications into two tasks, namely a transmit task and a receive task. Transmit tasks are carried out over the transmit (Tx) fiber of the fiber-optic link 146. Receive tasks are carried out over the receive (Rx) fiber of the fiber-optic link 146. When the signal conversion system is in an idle state, regular IP traffic passes between the back-end and front-end interface 122, 126 over the fiber-optic link 146 in a conventional manner allowing computer workstations 138 plugged into the Ethernet jacks 242 to communicate with the back-end interface 122.

For the communications devices 134, 136, when a telephone 134 or facsimile machine 136 that is connected to an analog telephone jack 170 goes off-hook, the off-hook condition is detected by the SLIC 180 and the microcontroller 200 is notified of the off-hook condition. The microcontroller 200 in turn opens an IP link with the back-end interface 122 that was established during initialization. Quality of service controls may then be invoked on the Ethernet switch 222 as required to tag Ethernet packets. As the outgoing number is dialed, the dialed number is managed by the SLIC 180 and sent to the microcontroller 200. The microcontroller 200 in turn conveys the dialing sequence to the Ethernet switch 222. The Ethernet switch 222 then routes the dialing sequence to the fiber-optic transceiver 234, which converts the dialing signals from electrical to optical form and transmits the signals over the transmit fiber of the fiber-optic pair 146 via the established IP link.

When the back-end interface 122 receives the optical signals, the received optical signals are converted back into electrical signals by the fiber-optic receiver 334 before being conveyed to the Ethernet switch 322. From the Ethernet switch 322, the dialing sequence is conveyed to the microcontroller 300. The microcontroller 300 in turn opens an outgoing line connection to the back-end communications system via the Codec 376, DAA 400 and HV protection circuit 378, and then transmits the dialing sequence to the back-end communications system. Ringing signals and progress tones received by the back-end interface 122 from the back-end communications system are returned back to the SLIC 180 in a similar manner.

When the call is answered and a communications connection with the called party has been established, voice and/or data signals are sent back and forth between the back-end interface 122 and front-end interface 126 over the transmit and receive fibers of the fiber-optic link 146 via the established IP link for the remainder of the call. When an on-hook state of the telephone 134 or facsimile machine 136 is detected by the SLIC 180, the call is terminated and the back-end and front-end interfaces 122, 126 return to the idle state.

When an incoming call directed to one of the telephones 134 or facsimile machines 136 is received from the back-end communications system, the incoming ringing signals are detected by the DAA 400. The DAA 400 notifies the microcontroller 300, which in turn opens a previously established IP link with the front-end interface 126. Similarly, quality of service is invoked on the Ethernet switch 322 as required. The microcontroller 300 conveys the ringing signals to the Ethernet switch 322. The Ethernet switch 322 in turn routes the ringing signals to the fiber-optic transceiver 334 which converts the signals from electrical to optical form and transmits the signals over the transmit fiber of the fiber-optic link 146 via the established IP link.

When the front-end interface 126 receives the optical signals, the received optical signals are converted back into electrical signals by the fiber-optic transceiver 234 before being conveyed to the Ethernet switch 222. From the Ethernet switch 222, the ringing signals are conveyed to the microcontroller 200. The microcontroller 200 in turn conveys the ringing signals to the analog telephone jack 170 via the Codec 176, SLIC 180 and HV protection circuit 178 causing the communications device connected to the jack to ring. Call status/progress signalling and ringing/progress tones are sent back to the back-end interface 122 over the IP link in the same manner.

When the call is answered and a communication connection with the calling party has been established, voice and/or data signals are sent back and forth over the transmit and receive fibers of the fiber-optic link 146 via the IP link for the remainder of the call. When the call is terminated and the telephone 134 or facsimile machine 136 returns to an on-hook condition, the on-hook condition is detected by the SLIC 180. The SLIC 180 in turn notifies the microcontroller 200, which in turn signals the microcontroller 300 allowing the back-end and front-end interfaces 122, 126 to return to the idle state.

Incoming and outgoing communications using a digital telephone plugged into jack 174 are carried out in a manner similar to that described above.

Although the NEATH-SLIC board 162 of the front-end interface 126 is described as including one RJ45 analog telephone jack 170 and one RJ45 digital jack 174, those of skill in the art will appreciate that the NEATH-SLIC board 162 may include more or fewer of each type of jack. Also, additional circuitry can be provided in the NEATH-SLIC board 162 to support enhanced telephony features.

The NEATH-SLIC board 162 may also be provided with local wireless interfaces such as Bluetooth, 802.11, or IrDA to enable wireless devices to communicate with the back-end communications system through the back-end and front-end interfaces 122, 126 in the same manner described above. Control ports can also be provided or the NEATH-SLIC board 162 to permit heating, ventilation and security systems to be controlled.

The Codec 176 is described as communicating with the microcontroller 200 over GCIs 184, 212. If desired, an Interchip Digital Link (IDL) interface may be used instead of the GCIs.

The fiber-optic link 146 used as the link between the back-end interface 122 and front end interface 126 may either be single-mode or multi-mode optic fiber. Although single-mode fiber is more intensive, it enables longer-distance optic fiber runs.

Figure 6:
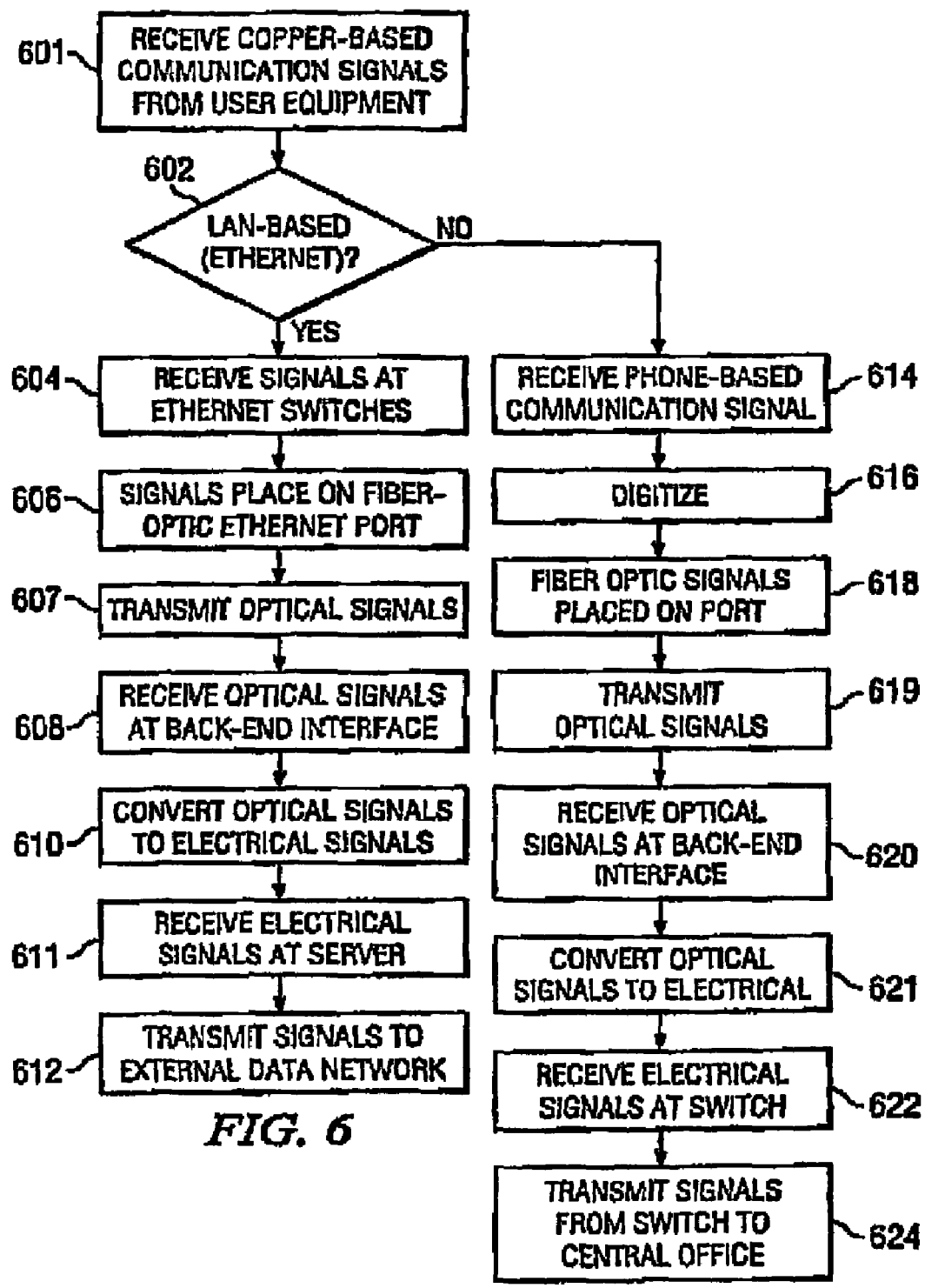
FIG. 6 illustrates a flow diagram of a method of using the fiber-optic premises wiring system illustrated in FIGS. 3 and 4.

Now turning to FIG. 6, a flow diagram illustrates a method of using the fiber-optic premises wiring system 112. As previously described, the microcontrollers 200, 300 operate under control of a Linux operating system or other operating system 202, 302, which allows the respective back-end interface 122 or front-end interface 126 to receive electrical Ethernet-type signals (e.g. Ethernet, token ring, etc.) as illustrated in block 601 and pass control to block 602. Block 602 is represented as a decision block, implying that the connection is received and then switched according to whether the received signals are detected to be data or voice signals. Although this is a possible embodiment, the wallboxes 140 described in this application may also have Ethernet jacks 242, 342, or phone jacks 170, 174, 370, 374, in which case the decision block 602 more generally just represents separate process flows undertaken for the signals coming in on the data and voice lines, i.e., blocks 604-12 for data and blocks 614-26 for voice.

At block 604, one or more of the Ethernet jacks 242 of the front-end interface 126 receive data communications signals from a communications device, such as a computer workstation 138. These communications might be Ethernet-type communications, token-ring communications, Firewire (IEEE-1394) communications, Universal Serial Bus (USB) communications, or other electrical or wireless communications according to the circuitry built into the wallbox 140 enabling the wallbox 140 to receive the particular type of communication. As previously mentioned, the wallbox 140 may have custom-designed "NEATH" boards to enable reception of one or more of the referenced communications protocols. The signals are received in this example at Ethernet transceivers 238 of the Ethernet switch 222.

At block 606, in this example, the 100BaseFX network switch 239 or other type of network switch is provided in order to generate a consolidated electrical communications signal for ultimate transmission by the fiber-optic transceiver 234. At block 607, the fiber-optic transceiver 234 receives the 100BaseFX or other protocol signal from the network switch 239 and generates corresponding fiber-optic signals.

At block 608, the reverse steps of blocks 604-07 are begun.

Specifically, the optical signals are received at the back-end interface 122 at the fiber-optic transceiver 334, which then converts those signals into a corresponding 100BaseFX network signal.

At block 610, the network switch 339 receives the 100BaseFX network signal and distributes the received network signal in its constituent elements. Alternatively, rather than breaking down the received network signal into constituent elements, it may be desirable to pass on substantially all of the properly formatted signal directly from the network switch 339 to a back-end, data communications service, such as an Internet Service Provider (ISP), thereby skipping block 611 (server receipt of data communications signals), and proceeding directly to step 612, which calls for the transmission of signals to an external data communications network. In certain embodiments, it may be desirable that the external data communications network (or telecommunications network) be an optical network even though it is still desired to use electrical communications equipment at the user premises.

Referring now specifically to block 611, the electrical communication signals are received at this block at the server 118 for the building's data communication system. At block 612, the server 118 then provides the aggregated communication systems from the portion of the network it is responsible for within the building onto the external data communications network via copper telecommunications cable 120. The external data communications network may be through an ISP, telephone company, or other entity responsible for providing the data communications services for the site. In addition to providing communication with the ISP or other provider, the server 118 also provides communication within the building from one computer workstation 138 to other workstations 138 or other devices within the building.

Although the above steps describe the transmission of data from the computer workstations 138 or other data communications devices, the same processes apply in reverse for the receipt of data communications from the data communications service and the conversion of those signals into optical signals and the subsequent re-conversion of the optical signals back into electrical signals for distribution to the data communications devices, such as the computer workstations 138.

Further, it is possible to enable communications between network devices at least two levels below the remote data communications service. For example, the network server 118 is operable to route packets through the above-described equipment between elements within the premises. Further, since there are provided microcontrollers within the wallboxes 140, it is also possible to provide local routing of traffic between commonly connected elements to the wallboxes 140 without the necessity of routing such traffic back to the network sever 118.

Figure 7:
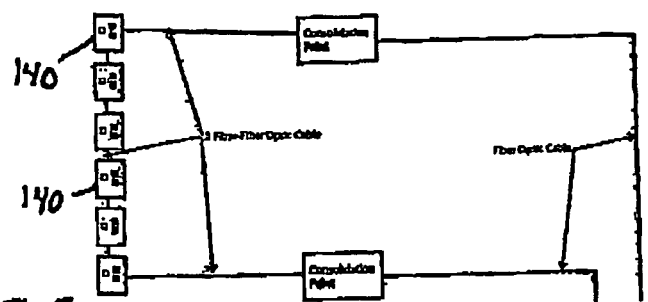
FIG. 7 illustrates a plurality of wallboxes arranged in a ring topology.

For example, turning to FIG. 7, a plurality of wallboxes 140 are shown daisy-chained together in a ring topology to provide path redundancy and increased communications capacity.

Of use to the local networking aspects described above and as mentioned previously, the front-end interface 126 is capable of providing virtual LAN or "V-LAN" tags, such that the server 118 can authenticate the point of origination of the communication connection. By using data packet tags or V-LAN tags, for example, security measures can be instituted to control access to premises network elements. This is particularly useful if the increased run lengths of the fiber-optic premises network is used to provide a common networking room for large portions of the building, such as might encompass multiple companies or working groups of an organization. Thus, for example, the computer workstations 138 on the top floor of the building could be precluded within server 118 from communicating with those devices on the second floor, by simply identifying the V-LAN tags as being incompatible with or not authorized for certain network elements.

Further, because of the processing power that is provided within the front-end interface 126, it is possible that communication could be enabled or disabled between different communications devices connected to the front-end interface 126. Thus, different V-LAN tags could be applied to the communications originating in one computer workstation 138 from those applied to another computer workstation 138. Also, if the computer workstations 138 are in the same network, front-end interface 126 could provide direct communications between the computer workstation 138 directly at the site without routing the signals through the network server 118.

Still further, due to the intelligence residing in the wallboxes 140, it is possible to budget the bandwidth provided to certain individual network connections or groups of network connections thereby to control quality-of-service, which can be set in order to prevent the computer workstations 138 from fighting over the same capacity. Additionally, the microcontroller 200 within the front-end interface 126 can adaptively adjust the quality of service provided to the different network devices to assure sufficient bandwidth is available to provide necessary services. For instance, the front-end interface 126 will provide telephony services to telephones 134, and it is important that the microcontroller 200 can also provide necessary service within the NEATH-SLIC board 162. In other words, the quality of service provided to the computer workstations 138 can be adjusted as necessary in order to meet more urgent communications needs over the building's optical communications network.

Still referring to FIG. 6, and referring now to phone-based analog or digital communications, at block 614, the front-end interface 126 receives telephony-based communication signals from the telephones 134. The front-end interface 126 is operable to combine these telecommunincations signals, which it receives on a twisted pair wire or other electrical conducting technology and is able to digitize those signals and provide them as a part of the optical communication signals flowing between the back-end interface 122 and front-end interface 126.

The voice signals can be digitized as synchronous digital voice communication signals such as ADPCM, or can be packetized and provided over a LAN-based communications protocol. In the described embodiments, the front-end interface 126 includes both digital and/or analog-based voice communications interfaces. Therefore, the front-end interface 126 is capable of receiving digital phone communication signals at an RJ16-type interface or analog communication signals at an RJ11-type interface, or other digital or analog phone signals over other types of interfaces. The communication of voice signals to and from the front-end interface 126 can be through straight point-to-point based voice communications protocols or through Voice over IP ("VoIP") voice protocols.

As illustrated at block 616, digitization is provided of the voice signal. At block 618, the front-end interface 126 provides the voice communication signals at the fiber-optic transceiver 234, similarly to step 606 for the data communication signal. When communicating with the telephones 134, the front-end interface 126 provides the voltages and currents expected by the RJ16-type connected telephone systems. The digitization of the phone signals at step 616 is an optional step that would be used for systems and plain analog-based phone communication signals.

At block 620, the back-end interface 122 receives the fiber-optic based voice communication signals. In some embodiments, it will be required to convert the optical signals into electrical signals at block 621.

Depending on whether the voice communication signals had been digitized from an analog-based telephone handset, or whether the voice communications signals were originally digital signals, the back-end interface 122 will convert the digital signals to analog signals, or not, for handling by either an analog or digital main telephone switch 114. It also may be possible to leave what were encoded analog voice signals in their encoded and multiplexed transmission states for multiplexed transmission directly to a remote telecommunication site such as a telephone company's central office exchange.

At block 622, the main telephone switch 114 receives the communication signals from the back-end interface 122 and is capable of switching those telephone communication signals to telephones 134 within the fiber-optic premises wiring system 112, or, at block 624, to make phone connections to the telephone company's central office exchange through the copper wire telecommunications line 116.

In addition to the other functions described above for the front-end interface 126, the front-end interface 126 can interface directly and communicate with an analog device connected to it. The front-end interface 126 thus can, for example, be designed to decode touch-tone instructions from a telephone handset for the control of heating and air conditioning, lighting, alarm or other systems. The same is true for digital telephones 134 or other digital devices such as computer workstations 138. In other words, digital devices can also be made to communicate directly with the microcontroller 200 within the front-end interface 126 to control the operation of the front-end interface 126 for the control of ancillary premises systems such as heating, air conditioning, and home alarms.

Figure 8A:
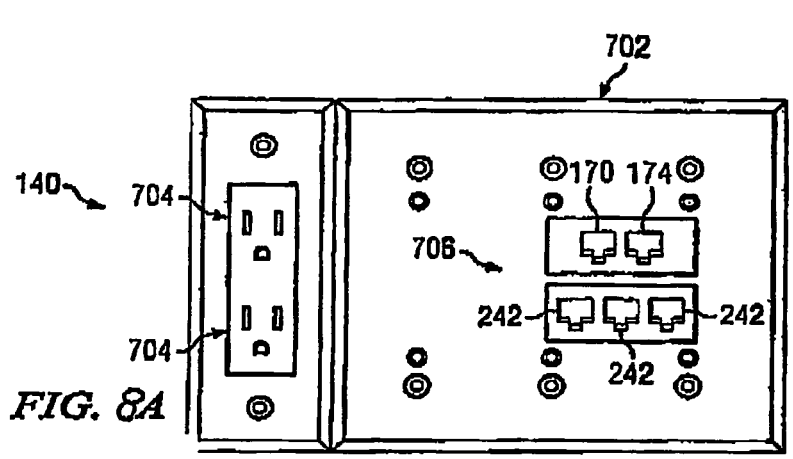
FIG. 8A illustrates a front elevation view of a wallbox forming part of the fiber-optic premises wiring system of FIGS. 3 and 4.
Figure 8B:
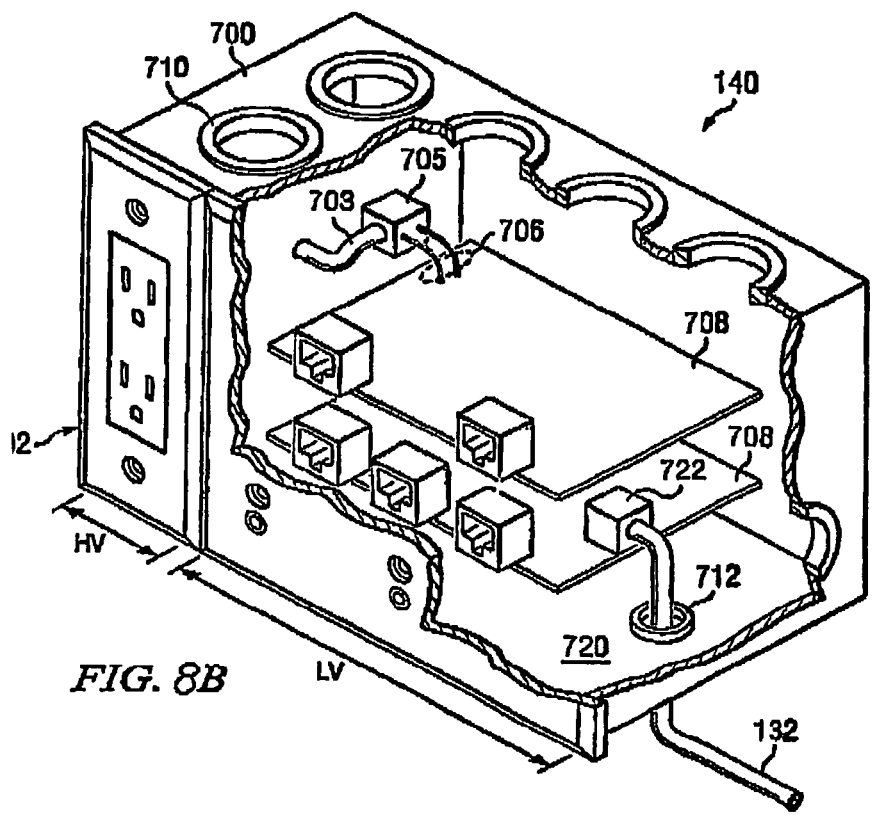

Turning now to FIGS. 8A and 8B, the wallbox 140 housing a front-end interface 126 is illustrated. The wallbox 140 includes a generally rectangular housing 700 having a front face panel 702 through which conventional 110-volt power supply sockets 704 are exposed. The wallbox housing 700 is generally rectangular and divided into a power outlet box and a gang box. The power supply sockets 704 are accommodated in the power outlet box. The front-end interface is accommodated in the gang box and includes an array 706 of jacks exposed via openings in the front panel 702. The jacks in the array 706 include the Ethernet jacks 242 and the telephone jacks 170, 174.

In the embodiment described above, the runs of fiber-optic cable 132 are described as terminating at wallboxes 140. If desired, one or more of the runs of the fiber-optic cable 132 may terminate at other types of mount boxes into which communications devices are plugged. The bottom 720 of the housing 700 has an opening 712 therein to allow the fiber-optic link 146 to pass through and be connected to the front-end interface 126.

In order to drive the communication circuitry of a practical system, it is necessary of course to provide electrical power to the system. To best accomplish this in a consumer-friendly manner, a transformer 705 receives the 120 volt high-voltage signals from a building power system 703 wires and provides a low voltage signal 706 for driving the circuitry of the front-end interface 126 that is mounted on the printed circuit boards 708.

As will be appreciated, the fiber-optic premises wiring system 112 allows communications devices configured for electrical signal communications to communicate with a back-end communications system over a fiber-optic link through modular interfaces. When the need arrives to switch the premises wiring fully to optical, only the interfaces need be replaced due to the fact that the underlying fiber-optic link between the back-end communications system and the communications devices is provided. Replacing the interfaces is an easy task due to their modular configuration. This will greatly help to reduce the future costs associated with the switch to fully fiber-optics.

Several embodiments have been described in detail hereinabove. It is to be understood that the scope of the invention also comprehends embodiments different from those described, yet within the scope of the claims. For example, the terms "microcontroller" "controller" "processing circuitry", and "control circuitry" comprehend ASICs (Application Specific Integrated Circuits), PAL (Programmable Logic Array Logic), PLAs (Programmable Logic Arrays), PLDs (Programmable Logic Devices), decoders, memories, non-software based processors, or other circuitry, or digital computers, including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as non-exhaustive in considering the scope of the invention. It should be understood that various embodiments of the invention can employ or be embodied in hardware, software or microcoded firmware.

While this invention has been described with reference to illustrative embodiments, this description is not intended to be construed in a limiting sense. A few preferred embodiments have been described in detail herein. It is to be understood that the scope of the invention also comprehends embodiments different from those described, yet within the scope of the claims. Words of inclusion are to be interpreted as nonexhaustive in considering the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the references in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their merits in light of the specification but should not be constrained by the headings included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are illustrated in the context of specific configurations. Other allocations of functionality are envisioned and will fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. An interface for a premises wiring system including a fiber-optic cable, wherein the fiber-optic cable is operable to connect at least one voice-type communications device and at least one data-type communications device to at least one communication system through the fiber-optic cable, the interface comprising:

a plurality of plug-in connectors operable to receive wired connections from the at least one voice-type communications device and the at least one data-type communications device;

control circuitry electrically connected through the plurality of connectors to the at least one voice-type communications device and operable to encode its voice-type communications signal into a certain format;

switch circuitry electrically connected to the plurality of connectors and the control circuitry, the switch circuitry operable to combine the encoded voice-type communications signal with at least a data-type communications signal from the data-type communications device to provide a combined electrical communications signal comprising the voice-type communications signal and the data-type communications signal; and an optical transceiver operable to receive the combined electrical communications signal and to transmit an optical signal bearing the information contained in the combined electrical communications signal, wherein the plurality of connectors, the control circuitry, the switch circuitry and the optical transceiver are all mounted into a single wallbox.

2. An interface according to claim 1 further comprising one or more electrical power outlets mounted into the single wallbox.

3. An interface according to claim 2 wherein the power to operate at least one of the control circuitry, the switch circuitry, and the optical transceiver is derived within the wallbox from the power supplied to the one or more electrical power outlets.

4. An interface according to claim 1 wherein the voice-type communications signal is an analog voice communications signal.

5. An interface according to claim 1 wherein the voice-type communications signal comprises communications from a facsimile machine.

6. An interface according to claim 1 wherein the voice-type communications signal is a digital voice communications signal.

7. An interface according to claim 1 wherein the control circuitry and the switch circuitry are able to receive and, when necessary, encode communication signals from disparate communications devices selected from the group consisting of: analog telephones, digital telephones, analog facsimile machines, digital facsimile machines, computer workstations, computer printers, mass storage devices, and media devices.

8. An interface according to claim 1 wherein the optical transceiver transmits and receives said optical signal using Internet Protocol ("IP").

9. An interface according to claim 1 wherein the interface is operable to provide additional functions selected from the group consisting of: decoding data packet tags in incoming packets in order to make packet routing decisions; adding data packet tags to data communication signals in order to facilitate later routing and security functions in the system; providing voice-over-IP encoding of voice signals; making quality-of-service allocations among the one or more voice-type communications devices; making quality-of-service allocations among the one or more data-type communications devices; providing light control functions within the premises; providing HVAC control functions within the premises; providing alarm control functions within the premises; and providing a web-server for the configuration of the interface.

10. An interface according to claim 9 wherein configuration of the interface includes uploading software updates.

11. An interface according to claim 9 wherein the data packet tags authenticate point of origin.

12. An interface according to claim 9 wherein quality-of-service allocations budget bandwidth among communications devices.

13. A premises wiring system for providing communications from at least one voice-type communications device and at least one data-type communication device to at least one back-end communications system through at least one fiber-optic cable within the premises, the premises wiring system comprising:

at least one front-end interface operable to connect to the at least one voice-type communications device, the at least one data-type communications device, and the at least one fiber-optic cable, the at least one front-end interface comprising:

a plurality of plug-in connectors operable to receive wired connections from the at least one voice-type communications device and the at least one data-type communications device;

front-end control circuitry electrically connected through the plurality of connectors to the at least one voice-type communication device and operable to encode its voice-type communications signal into a certain format;

front-end switch circuitry electrically connected to the plurality of connectors and the control circuitry, the switch circuitry operable to combine the encoded voice-type communications signal with at least a data-type communications signal from the data-type communications device to provide a front-end combined electrical communications signal comprising the voice-type communications signal and the data-type communications signal; and a front-end optical transceiver operable to receive the front-end combined electrical communications signal and to transmit an optical signal bearing the information contained in the combined electrical communications signal over the fiber-optic cable, wherein the plurality of connectors, the front-end control circuitry, the front-end switch circuitry and the front-end optical transceiver are all mounted within a single wallbox; and at least one back-end interface operable to connect to the at least one optic-fiber cable and to the at least one back-end communications device, the at least one back-end interface comprising:

a back-end optical transceiver operable to receive the optical signal and to generate from the optical signal a back-end combined electrical communications signal; and back-end switch circuitry operable to provide a plurality of communications signals from the back-end combined electrical communications signal.

14. A premises wiring system comprising at least one interface according to claim 1 for providing communications from at least one voice-type communications device and at least one data-type communication device to at least one back-end communications system through at least one fiber-optic cable within a premises, and at least one back-end interface operable to connect to the at least one optic-fiber cable and to the at least one back-end communications device.

15. A premises wiring system according to claim 14 wherein said back-end interface comprising:

a back-end optical transceiver operable to receive the optical signal and to generate from the optical signal a back-end combined electrical communications signal; and back-end switch circuitry operable to provide a plurality of communications signals from the back-end combined electrical communications signal.

16. A premises wiring system according to claim 15 further comprising back-end control circuitry operable to decode the at least one voice-type communications signal from its respective one of the plurality of communications signals received from the back-end switch circuitry.

17. A premises wiring system according to claim 15 wherein the back-end interface further comprises a plurality of connectors electrically connected to the back-end switch circuitry and operable to provide at least some of the plurality of communications signals to at least one back-end communications system.

18. A premises wiring system according to claim 14 wherein a transmit signal path is defined from the front-end interface to the back-end interface and wherein an opposing receive signal path is defined from the back-end interface to the front-end interface.

19. A premises wiring system according to claim 18 wherein the optical transceiver and switch circuitry in the front-end interface and the optical transceiver and switch circuitry in the back-end interface provide complementary communications signals traveling in both directions.

20. A premises wiring system according to claim 14 comprising a plurality of front-end interfaces positioned at various locations within said premises.

21. A premises wiring system according to claim 20 wherein said front-end interfaces are daisy-chained.

* * * * *